April 9, 1946.     W. G. LUNDQUIST     2,398,236
PROPELLER DRIVE GEAR
Filed July 19, 1940
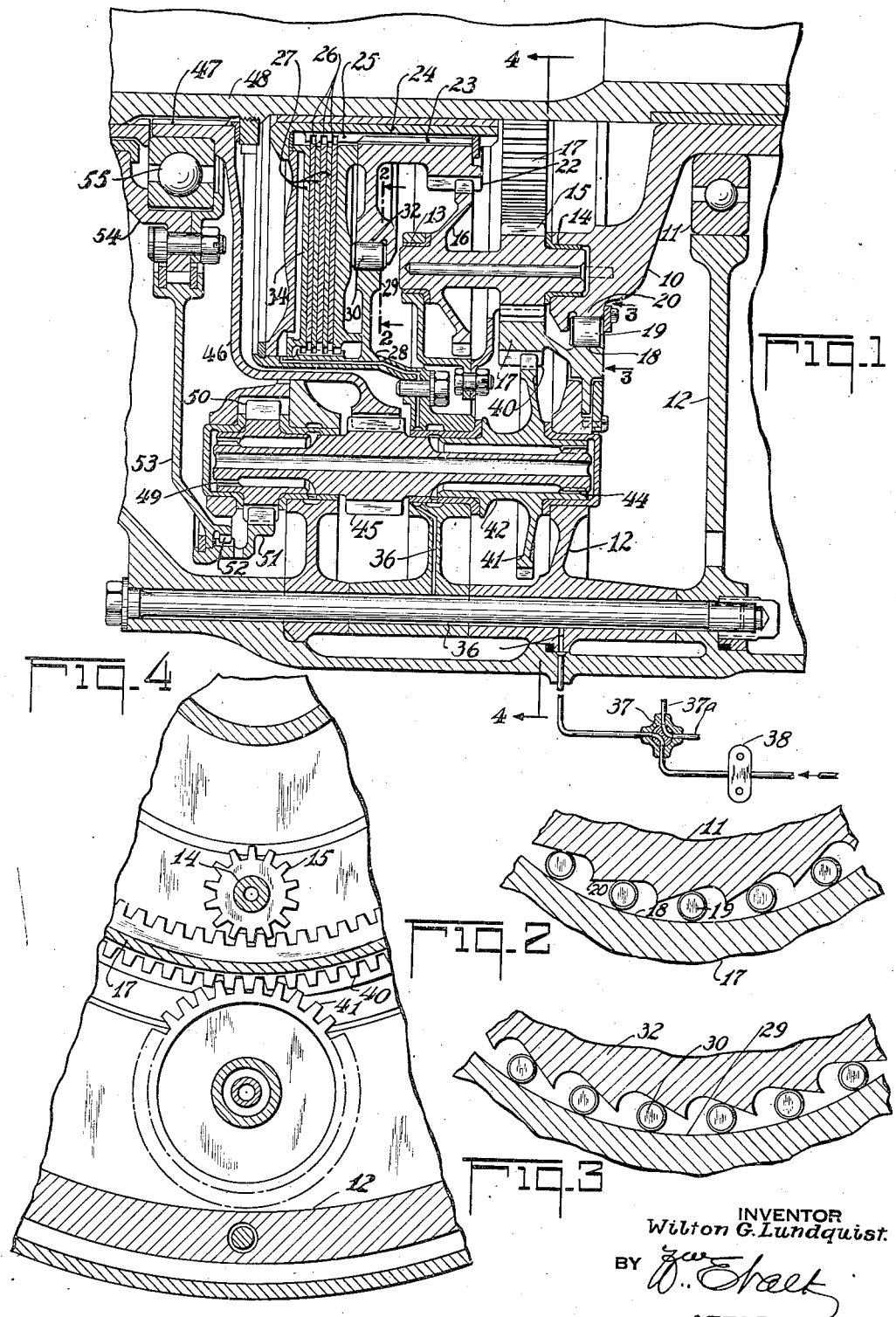
INVENTOR
Wilton G. Lundquist.
BY
ATTORNEY Patented Apr. 9, 1946

2,398,236

UNITED STATES PATENT OFFICE 2,398,236

PROPELLER DRIVE GEAR

Wilton G. Lundquist, Hohokus, N. J., assignor to Wright Aeronautical Corporation, a corporation of New York Application July 19, 1940, Serial No. 346,249

8 Claims. (Cl. 74—290)

This invention relates generally to multi-speed gear transmissions and is particularly concerned with a two speed propeller drive gear in aircraft.

An object of the invention is to provide a selectivly operable two-speed transmission between an aircraft engine and an aircraft propeller, the transmission in the aggregate including one drive ratio wherein the propeller rotates at a speed close to the rotational speed of the engine, and another ratio wherein the propeller operates at a substantially less speed than that of the engine. For purposes of identification in the ensuing description, the former will be referred to as the high ratio drive, and the latter as the low ratio drive.

A further object of the invention is to provide means by which the transmission will automatically go into the high ratio drive if a torque reversal takes place, regardless of the ratio selection for forward drive. That is, if the transmission is set for low ratio in normal drive where the engine drives the propeller, it will shift to high ratio if the propeller tends to drive the engine as might obtain in diving conditions of the aircraft or stalling of the aircraft engine in flight. By the same token, if the transmission is set for high ratio for normal engine to propeller drive, it will remain in that ratio should torque reversal take place. The advantage accruing from an arrangement such as that above indicated is that the propeller cannot freewheel with respect to the engine but constrains the latter to rotate with it, and does so under such a speed ratio condition that the propeller will have a large mechanical advantage in cranking the engine should the latter be stalled. Also, in diving conditions, this arrangement permits the propeller to rotate at high speed without over-speeding the engine proper.

The use of a two-speed propeller gear, particularly in high performance and high speed aircraft, becomes more and more desirable, which can be appreciated from the following example:

For take-off and climbing conditions, it is desirable to have the propeller rotate somewhere near full power engine speed—say 2400 R. P. M. for engines of present types. In this situation, the propeller pitch will be relatively flat in order to get maximum thrust under the low air speed conditions of take off and climb. For high speed level flight conditions, however, where the aircraft may be travelling at a speed of, say 400 miles per hour, the propeller advances into the relative wind so fast that the pitch thereof may be stepped up very steeply, while the propeller rotates at a relatively low R. P. M., whereby the propeller tip speed is held down to not more than about 1,000 feet per second, or below the velocity of sound. Thus, to obtain full power at high altitudes with the propeller adjusted as just mentioned, it is desirable to have a drive from the engine to the propeller whereby the engine may rotate at its full power speed—2400 R. P. M.—the example cited—while the propeller rotates at approximately one-half of such speed. Such a condition for engine-propeller ratio and propeller adjustment allows for maximum speed at optimum economy.

The high ratio drive, as above pointed out, is most desirable for conditions wherein the propeller tends to drive or overrun the engine and accordingly the invention provides means so that the transmission will be shifted to the high ratio drive after it is in the low ratio, or will remain in the high ratio drive after it is already there, when propeller overrun exists.

The details of the invention, along with further objects thereof will become apparent in reading the annexed description in connection with the drawing, in which:

Fig. 1 is a fragmentary axial section, below the center line of the propeller of a two-speed propeller drive transmission, adapted for operation of two oppositely rotating concentric propellers, and Figs. 2, 3, and 4 are respectively sections on the lines 2—2, 3—3, and 4—4 of Fig. 1.

In the drawing, the numeral 10 represents a driving member which may be an engine crankshaft or an element driven from the engine. This is carried by a bearing 11 in a housing 12 and comprises a spider having bearings 13 and 14 in which compound planet pinions are borne, the pinions of the compound set being numbered 15 and 16. The pinions 15 engage a ring gear 17 which includes a one-way roller clutch race 18 engaged with clutch rollers 19 which in turn engage serrations 20 formed on the drive member 10. The planet pinions 16 engage a sun gear 22 which is splined at 23 to a member 24 which is freely rotatable. Said member including serrations 25 carries alternate brake plates 26 between brake plates 27 splined at their outer edges to a brake housing 28 rigid with the housing 12. The housing 28 also includes a raceway 29, rollers 30, and serrated tracks 32 integral with the sun gear 22 to comprise a one-way brake. The brake comprised of the plates 26 and 27 is operated hydraulically by a piston 34 slidable within the housing 28 and selectively subject to fluid pressure through passages 36 leading from a valve 37 fed from an engine driven fluid pump 38. The valve 37 may be moved to feed fluid pressure to the hydraulic brake by which the sun gear 22 is locked against rotation or may be moved to a position wherein the hydraulic brake is drained to the engine oil sump by which the sun gear 22 is rendered free to rotate, but only in one direction as allowed by the one way brake 30. In the valve 37, the lines 37a would both lead to the engine oil sump.

Operation of the transmission as described, considering the ring gear 17 as the driven element, is as follows: In connection with the explanation below, reference should be made to Figs. 2 and 3. Assume that the direction of rotation of the driving member is clockwise when viewing the transmission from the driving end and that high ratio drive is desired. To attain high ratio, the brake 26, 27 is locked against rotation by which the sun gear becomes a non-rotatable reaction gear. The planets 16 and 15 carried by the driving member 10, planetize about the sun gear 22 and step up the rotational speed of the ring gear 17 upon which action, the one-way clutch 19 overruns. The roller brake 30 in this situation has no function since the plate brake 26, 27 is locked. Now, if low ratio drive be desired, the brake 26, 27 is freed by operation of the valve 37. Direct drive will now flow from the driving member 10 to the driven ring gear 17 through the roller clutch 19, causing the pinions 16, 17 and the sun gear 22 to rotate as a unit therewith, during which time the one way brake 30 overruns. In this setting, should torque reversal take place wherein the ring gear 17 becomes the driving member and the element 10 the driven member, the one way clutch 19 will overrun and the drive will drop back upon the pinions 16 and 17 and the sun gear 22 which, since it is constrained to only unidirectional rotation by the brake 30, will cease rotating and will become a reaction member wherefore the ring gear 17 may rotate at a speed substantially greater than that of the element 10.

To carry the propeller drive from the ring gear 17 on, said ring gear 17 is provided with external teeth 40 meshed with a gear 41 on a layshaft 42 borne in the housing 12. In practice, a plurality of such layshafts would be spaced around the gear 17. The layshaft 42 is splined at 44 to a shaft carrying a pinion 45 meshed with a gear 46 splined at 47 to one propeller shaft 48 upon which, incidentally, the sleeve 24 rotates. The shaft for the pinion 45 is splined at 49 to a pinion 50 meshed with an internal gear 51 splined at 52 to a web 53 secured to an external propeller shaft 54 concentric with the shaft 48. A ball bearing 55 runs between the shafts 48 and 54 for piloting and thrust purposes. Thus, the layshaft 42 and its associated pinions carry the drive from the ring gear 17 to the propeller shafts 48 and 54 in a step down ratio. It is obvious that the ratios may be adjusted to any desirable amount in cooperation with the ratio of the planetary gearset whereby, when there is direct drive from the driven member 11 to the ring gear 17, the aggregate ratio from the driving member 10 to the propellers may be of the order of 2:1. Correspondingly, when the brake 26, 27 is engaged, the step-up afforded by the planetary gearset may be compensated by the step-down from the layshaft to the propeller shaft so that the aggregate drive ratio from the driving member 10 to the propeller shafts 48 and 54 may be of the order of 1:1. The aggregate drive ratios of 2:1 and 1:1 are in no sense to be construed as limitations upon the invention, for any ratios appropriate to the mechanism with which the device is intended to be used may be selected and designed into the system.

For the purpose of avoiding possible confusion either in the specification or in the claims, the invention can be considered as a transmission having two different drive ratios, regardless of order, selectively engageable for normal drive from the driving member or engine to the driven member or propeller, and that, when drive reversal takes place, the transmission will automatically drop into one of said ratios regardless of whether, for the forward drive, it has been selectively adjusted for either one of the ratios.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a planetary gearset, a driving member carrying planet pinions, a driven member comprising a gear meshed with said pinions, a one-way clutch between the driving and driven members, a reaction gear meshed with said pinions, means selectively operable to anchor the reaction gear against rotation or to allow free rotation thereof in only one direction, a layshaft gear driven by said driven member, a pinion element on the layshaft, and a propeller shaft having an external gear driven by the layshaft pinion element.

2. In a planetary gearset, a driving member carrying planet pinions, a driven member comprising a gear meshed with said pinions, a one-way clutch between the driving and driven members, a reaction gear meshed with said pinions, means selectively operable to anchor the reaction gear against rotation or to allow free rotation thereof in only one direction, a layshaft gear driven by said driven member, pinions on the layshaft, a first propeller shaft having an external gear driven by one layshaft pinion, and a second propeller shaft concentric with the first having an internal gear driven by the other pinion.

3. In a transmission, a planetary gearset including a reaction sun gear, means operable to lock the sun gear from rotation or to free same for rotation, a spider having pinions meshed with the gear, a ring gear drivably associated with the pinions, a plurality of layshafts disposed around the ring gear, the latter having external teeth, layshaft pinions engaging said teeth, a driven gear concentric with the sun and ring gears, and layshaft pinions meshed with said driven gear.

4. In a transmission, a planetary gearset including a reaction sun gear, means operable to lock the sun gear from rotation or to free same for rotation, a spider having pinions meshed with the gear, a ring gear drivably associated with the pinions, a plurality of layshafts disposed around the ring gear, the latter having external teeth, layshaft pinions engaging said teeth, a driven gear concentric with the sun and ring gears, and layshaft pinions meshed with said driven gear, said planetary gearset including a one-way brake for the sun gear and a one-way clutch between the spider and ring gear.

5. In a transmission, a plurality of circumferentially disposed parallel layshafts defining a chamber therewithin, a change speed gearset in said chamber, means to drive the layshafts from said gearset, an output shaft concentric with the envelope of said layshafts, and a driving connection from each layshaft to said output shaft.

6. In a transmission, a plurality of circumferentially disposed parallel layshafts defining a chamber therewithin, three pinions on each layshaft, a change speed gearset in the chamber, an output gear in the gearset engaging a first pinion on each layshaft, an externally toothed driven gear engaging a second pinion of each layshaft, and a driven ring gear engaging a third pinion of each layshaft.

7. In a transmission in combination, a change speed gearset including an input shaft and an output gear concentric therewith, the output gear being operable at different speeds than the input shaft, a plurality of layshafts forming a cage around the gearset each having a pinion engaging said output gear, a shaft concentric with the output gear, and driving connections from said layshafts to said concentric shaft.

8. In a transmission in combination, a change speed gearset including an input shaft and an output gear concentric therewith, the output gear being operable at different speeds than the input gear, a plurality of layshafts forming a cage around the gearset each having a pinion engaging said output gear, two shafts one sleeved over the other and both concentric with said output gear, a driving connection from said layshafts to one of said two shafts, and a reverse driving connection from said layshafts to the other of said two shafts.

WILTON G. LUNDQUIST.